United States Patent
Kohsaka et al.

(10) Patent No.: US 11,066,716 B2
(45) Date of Patent: Jul. 20, 2021

(54) STEEL SHEET AND METHOD FOR PRODUCING THE SAME

(71) Applicant: JFE Steel Corporation, Tokyo (JP)

(72) Inventors: Noriaki Kohsaka, Tokyo (JP); Tatsuya Nakagaito, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 175 days.

(21) Appl. No.: 16/320,209

(22) PCT Filed: Aug. 10, 2017

(86) PCT No.: PCT/JP2017/029035
§ 371 (c)(1),
(2) Date: Jan. 24, 2019

(87) PCT Pub. No.: WO2018/030501
PCT Pub. Date: Feb. 15, 2018

(65) Prior Publication Data
US 2019/0271052 A1    Sep. 5, 2019

(30) Foreign Application Priority Data

Aug. 10, 2016   (JP) .............................. JP2016-157761

(51) Int. Cl.
*C23C 2/40*     (2006.01)
*C21D 8/02*     (2006.01)
(Continued)

(52) U.S. Cl.
CPC .......... *C21D 8/0463* (2013.01); *C21D 6/001* (2013.01); *C21D 6/002* (2013.01); *C21D 6/004* (2013.01); *C21D 6/005* (2013.01); *C21D 6/008* (2013.01); *C21D 6/02* (2013.01); *C21D 8/0205* (2013.01); *C21D 8/0226* (2013.01); *C21D 8/0236* (2013.01); *C21D 8/0263* (2013.01); *C21D 9/46* (2013.01); *C22C 38/001* (2013.01); *C22C 38/002* (2013.01); *C22C 38/005* (2013.01); *C22C 38/008* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/22* (2013.01); *C22C 38/28* (2013.01); *C22C 38/34* (2013.01); *C22C 38/36* (2013.01); *C22C 38/38* (2013.01); *C22C 38/44* (2013.01); *C22C 38/46* (2013.01); *C22C 38/48* (2013.01); *C22C 38/50* (2013.01); *C22C 38/54* (2013.01); *C22C 38/58* (2013.01);
(Continued)

(58) Field of Classification Search
CPC ...... C21D 8/0463; C21D 6/001; C21D 6/002; C21D 6/004; C21D 6/005; C21D 6/008; C21D 6/02; C21D 8/0205; C21D 8/0226; C21D 8/0236; C21D 8/0263; C21D 9/46; C21D 8/0405; C21D 8/426; C21D 8/436; C21D 2211/004; C21D 2211/005; C21D 2211/008; C23C 2/02; C23C 2/06; C23C 2/28; C23C 2/40; B23K 11/11; C22C 18/00; C22C 38/48; C22C 38/001; C22C 38/002; C22C 38/005; C22C 38/008; C22C 38/02; C22C 38/04; C22C 38/06; C22C 38/08; C22C 38/12; C22C 38/14; C22C 38/22; C22C 38/28; C22C 38/34; C22C 38/36; C22C 38/38; C22C 38/44; C22C 38/46; C22C 38/50; C22C 38/54; C22C 38/58; C22C 38/60
See application file for complete search history.

(56) References Cited

U.S. PATENT DOCUMENTS

2009/0277547 A1*  11/2009  Saito ....................... C22C 38/12
                                                    148/661
2010/0139816 A1*   6/2010  Hanlon ................... C22C 18/02
                                                    148/526
(Continued)

FOREIGN PATENT DOCUMENTS

CN   105473749 A   4/2016
EP   2053140 A1    4/2009
(Continued)

OTHER PUBLICATIONS

International Search Report and Written Opinion for International Application No. PCT/JP2017/029035, dated Nov. 7, 2017—5 pages.
Yamashita et al., "Analysis Technology of Microstructure Formation in High Performance Dual Phase Steel", JFE Technical Report, No. 22 (Mar. 2017), pp. 25-29, JFE GIHO No. 37 Feb. 2016, pp. 22-25.
Korean Grant of Patent for Korean Application No. 10-2019-7002527, dated Nov. 2, 2020, with translation, 2 pages.
Chinese Office Action with Search Report for Chinese Application No. 201780046408.4, dated Jul. 9, 2020, 9 pages.
Extended European Search Report for European Application No. 17 839 568.7, dated May 20, 2019, 8 pages.
(Continued)

*Primary Examiner* — Anthony J Zimmer
*Assistant Examiner* — Dean Mazzola
(74) *Attorney, Agent, or Firm* — RatnerPrestia

(57) ABSTRACT

Provided are a steel sheet which has a tensile strength of 900 MPa or higher and excellent weldability, and a method for producing the steel sheet. The steel sheet has a specific composition and a microstructure containing, in terms of area fraction, ferrite of 30% or less (including 0%), tempered martensite of 70% or more (including 100%), and the balance other than ferrite and the tempered martensite of 10% or less (including 0%) in total, the tempered martensite having an average grain size thereof is 5 μm or lower, the tempered martensite having iron-based carbides, which have average particle sizes of 100 nm or less, precipitated on grain boundaries, and the tempered martensite containing, in terms of atomic concentration, 5 atom % or more in total of Si and Mn on the grain boundaries of the tempered martensite. The steel sheet has a tensile strength of 900 MPa or higher.

20 Claims, No Drawings

(51) Int. Cl.
| | |
|---|---|
| C21D 6/00 | (2006.01) |
| C21D 8/04 | (2006.01) |
| C21D 9/46 | (2006.01) |
| C22C 38/02 | (2006.01) |
| C22C 38/00 | (2006.01) |
| C22C 38/04 | (2006.01) |
| C22C 38/06 | (2006.01) |
| C22C 38/08 | (2006.01) |
| C22C 38/12 | (2006.01) |
| C22C 38/14 | (2006.01) |
| C22C 38/22 | (2006.01) |
| C22C 38/34 | (2006.01) |
| C22C 38/36 | (2006.01) |
| C22C 38/44 | (2006.01) |
| C22C 38/46 | (2006.01) |
| C22C 38/48 | (2006.01) |
| C22C 38/50 | (2006.01) |
| C22C 38/54 | (2006.01) |
| C22C 38/58 | (2006.01) |
| C22C 38/60 | (2006.01) |
| C23C 2/02 | (2006.01) |
| C23C 2/06 | (2006.01) |
| C22C 38/38 | (2006.01) |
| C21D 6/02 | (2006.01) |
| C22C 38/28 | (2006.01) |
| C23C 2/28 | (2006.01) |
| C22C 18/00 | (2006.01) |
| B23K 11/11 | (2006.01) |

(52) U.S. Cl.
CPC .............. *C22C 38/60* (2013.01); *C23C 2/02* (2013.01); *C23C 2/06* (2013.01); *C23C 2/28* (2013.01); *C23C 2/40* (2013.01); *B23K 11/11* (2013.01); *C21D 8/0405* (2013.01); *C21D 8/0426* (2013.01); *C21D 8/0436* (2013.01); *C21D 2211/004* (2013.01); *C21D 2211/005* (2013.01); *C21D 2211/008* (2013.01); *C22C 18/00* (2013.01)

(56) References Cited

U.S. PATENT DOCUMENTS

| | | | |
|---|---|---|---|
| 2010/0252147 A1* | 10/2010 | Murakami | ........... C21D 8/0447 148/332 |
| 2012/0009434 A1 | 1/2012 | Hata et al. | |
| 2016/0160310 A1 | 6/2016 | Hasegawa et al. | |
| 2016/0319385 A1 | 11/2016 | Hasegawa et al. | |
| 2017/0183751 A1 | 6/2017 | Tsunezawa et al. | |
| 2017/0204492 A1 | 7/2017 | Ueda et al. | |

FOREIGN PATENT DOCUMENTS

| | | |
|---|---|---|
| EP | 2216422 A1 | 8/2010 |
| EP | 2251448 A1 | 11/2010 |
| EP | 2998416 A1 | 3/2016 |
| EP | 3128026 A1 | 2/2017 |
| JP | 2004232022 A | 8/2004 |
| JP | 2012031462 A | 2/2012 |
| JP | 2015200013 A | 11/2015 |
| JP | 5858199 B2 | 2/2016 |
| JP | 2016037650 A | 3/2016 |
| JP | 2016050343 A | 4/2016 |
| KR | 20100105799 A | 9/2010 |
| WO | 2012120020 A1 | 9/2012 |
| WO | 2015151428 A1 | 10/2015 |

OTHER PUBLICATIONS

Chinese Office Action with Search Report for Chinese Application No. 201780046408.4, dated Feb. 4, 2021, with Concise Statement of Relevance of Office Action, 9 pages.

* cited by examiner

STEEL SHEET AND METHOD FOR PRODUCING THE SAME

CROSS REFERENCE TO RELATED APPLICATIONS

This is the U.S. National Phase application of PCT/JP2017/029035, filed Aug. 10, 2017, which claims priority to Japanese Patent Application No. 2016-157761, filed Aug. 10, 2016, the disclosures of these applications being incorporated herein by reference in their entireties for all purposes.

FIELD OF THE INVENTION

The present invention relates to a steel sheet and a method for producing the steel sheet.

BACKGROUND OF THE INVENTION

In recent years, from the viewpoint of global environment conservation, the whole automobile industry aims to improve fuel efficiency of the automobile to regulate $CO_2$ emissions. To improve the fuel efficiency of the automobile, reducing the weight of the automobile by using the components thereof with the thinner walls is most effective. Therefore, in recent years, the use of high-strength steel sheet (highly strengthened steel sheet) as a material for the automobile parts has increased.

Meanwhile, the weldability of the steel sheet tends to deteriorate as the strength increases. Therefore, a steel sheet having not only the high strength, but also excellent weldability is desired. A steel sheet that does not have the satisfactory weldability cannot be used for the automobile parts or the like, because such a steel sheet causes defects such as cracks when joining automotive members to each other by welding. For reducing the weights of the automobile parts or the like, it is essential to develop a steel sheet that has both high strength and weldability, and various techniques have been proposed so far to provide high-strength cold-rolled steel sheets and hot dipped steel sheets that are focused on the weldability.

For example, according to PTL 1, a high-strength hot-dip galvanized steel sheet with excellent spot weldability, anti-crash property and bending formability can be obtained by containing, in mass %, C: 0.05 to 0.15%, Si: 0.01 to 1.00%, Mn: 1.5 to 4.0%, P: 0.100% or less, S: 0.02% or less, Al: 0.01 to 0.50%, Cr: 0.010 to 2.000%, Nb: 0.005 to 0.100%, Ti: 0.005 to 0.100%, B: 0.0005 to 0.0050%, while containing Si, Mn, Cr, and B in a specific range, and having a microstructure (steel structure) containing, in terms of area fraction, ferrite: 10% or less, bainitic ferrite: 2 to 30%, and martensite: 60 to 98%, where the proportion of retained austenite determined by using an X-ray diffraction method is less than 2%, the proportion of massive martensite adjacent only to bainite in the whole microstructure is 10% or less, and a difference in hardness is specified between positions that are located 100 μm and 20 μm away from the surface.

According to PTL 2, a cold-rolled steel sheet with excellent spot weldability and with a tensile strength of 980 MPa or higher can be obtained by containing, in mass %, C: 0.05 to 0.13%, Si: 0.05 to 2.0%, Mn: 1.5 to 4.0%, P: 0.05% or less, S: 0.005% or less, Al: 0.01 to 0.1%, Cr: 0.05 to 1.0%, Nb: 0.010 to 0.070%, Ti: 0.005 to 0.040%, and N: 0.0005 to 0.0065%, wherein 70% or more of Ti contained in the steel is precipitated, and 15% or more of Nb in the steel is in a solute state.

According to PTL 3, a cold-rolled steel sheet, a hot-dip galvanized steel sheet, and a hot-dipped galvannealed steel sheet with excellent ductility, stretch flange formability, and weldability, having a tensile strength of 980 MPa or higher and 0.2% proof stress of 700 MPa or less can be obtained, while these contain, in mass %, C: 0.07 to 0.15%, Si: 1.1 to 1.6%, Mn: 2.0 to 2.8%, P: more than 0% and 0.015% or less, S: more than 0% and 0.005% or less, Al: 0.015 to 0.06%, Ti: 0.010 to 0.03%, and B: 0.0010 to 0.004%, and have a microstructure to be described below having, at a position located at ¼ of the sheet thickness away from the surface of the steel sheet, an area fraction satisfying tempered martensite: 10 area % or more and less than 30 area %, bainite: more than 70 area %, a total of tempered martensite and bainite: 90 area % or more, ferrite: 0 area % or more and 5 area % or less, and retained austenite: 0 area % or more and 4 area % or less.

PATENT LITERATURE

PTL 1: Japanese Patent No. 5858199
PTL 2: Japanese Unexamined Patent Application Publication No. 2015-200013
PTL 3: Japanese Unexamined Patent Application Publication No. 2016-37650

SUMMARY OF THE INVENTION

In the technique proposed in PTL 1, only specification of the C, Si, P and S contents is done as the requirements for excellent spot weldability, and the spot weldability is not sufficient in some cases.

In the technique proposed in PTL 2, it is described that Nb-based precipitates are dissolved by heating at a temperature of (Ts-50°) C. or higher in the slab reheating step before hot rolling, but an annealing temperature of 900° C. or lower is a temperature range where Nb-based carbides inevitably precipitate, thus solute Nb cannot be stably retained at 15%.

In the technique proposed in PTL 3, while only lowering C is described as the direction for improving weldability, likewise in PTL 1, the spot weldability is not sufficient in some cases.

Aspects of the present invention have been made in view of such circumstances, and an object thereof is to provide a steel sheet with a tensile strength of 900 MPa or higher and excellent weldability, and a method for producing the steel sheet.

To solve the problems mentioned above, the present inventors conducted intensive studies on the requirements for a steel sheet with both a tensile strength of 900 MPa or higher and excellent weldability. The sheet thickness of the steel sheet being studied in this case was 0.4 mm or more and 3.2 mm or less. In spot welding, depending on conditions, a cracking problem occurred after welding. As a result of intensive studies on the welding conditions and the microstructures of the steel sheets where cracking occurred, it was found that, when welding a galvanized steel sheet and a cold-rolled steel sheet together or welding galvanized steel sheets to each other, cracks were induced due to grain boundary corrosion by zinc; that, for suppressing the grain boundary corrosion by zinc, it was effective to control concentrations of the elements on the grain boundary by reducing a difference in hardness from the weld metal part; and that cracking was also induced by coarse precipitates existing on the grain boundary. Aspects of the present invention have been completed on the basis of such findings and the summary is as follows.

[1] A steel sheet having a composition containing, in mass %, C: 0.07% or more and 0.20% or less, Si: 0.60% or more and 1.65% or less, Mn: 1.8% or more and 3.5% or less, P: 0.05% or less, S: 0.005% or less, Al: 0.08% or less, N: 0.0060% or less, and the balance being Fe and unavoidable impurities; a microstructure containing, in terms of area fraction, ferrite of 30% or less (including 0%), tempered martensite of 70% or more (including 100%), and the balance other than the ferrite and the tempered martensite including 10% or less (including 0%) in total, the tempered martensite having an average grain size of 5 μm or less, the tempered martensite having iron-based carbides, which have an average particle size of 100 nm or less, precipitated on grain boundaries thereof, and the tempered martensite containing, in terms of atomic concentration, 5% or more in total of Si and Mn on the grain boundaries of the tempered martensite; and a tensile strength of 900 MPa or higher.

[2] The steel sheet according to [1], in which the composition further contains, in mass %, one or two or more selected from V: 0.001% or more and 1% or less, Ti: 0.001% or more and 0.3% or less, and Nb: 0.001% or more and 0.3% or less, and the microstructure contains a carbide containing at least one of V, Ti and Nb and having an average particle size of 20 nm or less.

[3] The steel sheet according to [1] or [2], in which the composition further contains, in mass %, one or two or more selected from Cr: 0.001% or more and 1.0% or less, Mo: 0.001% or more and 1.0% or less, Ni: 0.001% or more and 1.0% or less, B: 0.0001% or more and 0.0050% or less, and Sb: 0.001% or more and 0.050% or less, and the microstructure contains, in terms of atomic concentration, 5% or more in total of Cr, Mo, Ni, B, and Sb on the grain boundaries of the tempered martensite.

[4] The steel sheet according to any of [1] to [3], in which the composition further contains, in mass %, one or two or more selected from REM, Sn, Mg, and Ca of 0.0001% or more and 0.1% or less in total.

[5] The steel sheet according to any of [1] to [4], further including a coating layer on a surface thereof.

[6] The steel sheet according to [5], in which the coating layer has a composition containing, in mass %, Fe: 20.0% or less, Al: 0.001% or more and 3.5% or less, one or two or more selected from Pb, Sb, Si, Sn, Mg, Mn, Ni, Cr, Co, Ca, Cu, Li, Ti, Be, Bi and REM of 0% to 3.5% in total, and the balance being Zn and unavoidable impurities.

[7] The steel sheet according to [5] or [6], in which the coating layer is an alloyed hot-dip layer.

[8] A method for producing the steel sheet according to any of [1] to [4], the method including: heating a steel material at 1150° C. or higher and 1350° C. or lower, hot-rolling including rough rolling and finish rolling the steel material at a finish rolling temperature of 820° C. or higher, coiling at 350° C. or higher and 680° C. or lower, cold-rolling, heating and retaining at 840° C. or higher for 30 seconds or more, then cooling to 100° C. or lower at an average cooling rate of 200° C./s or more from a cooling starting temperature to a Ms point, re-heating and retaining at 840° C. or higher for 30 seconds or more, then cooling to (Ms point—100° C.) or lower at an average cooling rate of 20° C./s or more from a cooling starting temperature to (Ms point—100° C.), heating or cooling as necessary, and retaining at 200° C. or higher and 400° C. or lower for 20 seconds or more and 1800 seconds or less.

[9] A method for producing the steel sheet according to any of [5] to [7], the method comprising: heating a steel material at 1150° C. or higher and 1350° C. or lower, hot-rolling including rough rolling and finish rolling at a finish rolling temperature of 820° C. or higher, coiling at 350° C. or higher and 680° C. or lower, cold-rolling, heating and retaining at 840° C. or higher for 30 seconds or more, then cooling to 100° C. or lower at an average cooling rate of 200° C./s or more from a cooling starting temperature to 200° C., re-heating and retaining at 840° C. or higher for 10 seconds or more and 150 seconds or less, then cooling to 260° C. or lower at an average cooling rate of 20° C./s or more from a cooling starting temperature to 260° C., heating or cooling as necessary, retaining at 200° C. or higher and 400° C. or lower for 20 seconds or more and 150 seconds or less, and subjecting to a coating treatment by immersing in a plating bath, or subjecting to an alloying treatment in addition to the coating treatment.

The steel sheet according to aspects of the present invention has both high strength with a tensile strength (TS) of 900 MPa or higher and excellent weldability. When the steel sheet according to aspects of the present invention is applied as automobile parts, further reduction in weight of the automobile parts is realized.

DETAILED DESCRIPTION OF EMBODIMENTS OF THE INVENTION

Hereinafter, embodiments according to the present invention will be described. In addition, the present invention is not limited to the embodiments described below.

<Composition>

A steel sheet according to aspects of the present invention has a composition containing, in mass %, C: 0.07% or more and 0.20% or less, Si: 0.60% or more and 1.65% or less, Mn: 1.8% or more and 3.5% or less, P: 0.05% or less, S: 0.005% or less, Al: 0.08% or less, N: 0.0060% or less, and the balance being Fe and unavoidable impurities.

The composition may further contain, in mass %, one or two or more selected from V: 0.001% or more and 1% or less, Ti: 0.001% or more and 0.3% or less, and Nb: 0.001% or more and 0.3% or less.

In addition, the composition may further contain, in mass %, one or two or more selected from Cr: 0.001% or more and 1.0% or less, Mo: 0.001% or more and 1.0% or less, Ni: 0.001% or more and 1.0% or less, B: 0.0001% or more and 0.0050% or less, and Sb: 0.001% or more and 0.050% or less.

Hereinafter, each of the components will be specifically described. In the following description, representing the content of components refers to "mass %".

C: 0.07% or More and 0.20% or Less

Carbon (C) is an element related to the hardness of tempered martensite and effective for increasing the strength of the steel sheet. In order to obtain a tensile strength of 900 MPa or higher, at least the C content needs to be 0.07% or more. Meanwhile, when C content exceeds 0.20%, the hardness of the weld metal in spot welding excessively increases, spot weldability is lowered due to occurrence of difference in hardness from the heat-affected zone (HAZ). Furthermore, the spot weldability deteriorates also in view of increased particle size of the iron-based carbide precipitated on the grain boundary of the tempered martensite. Therefore, C content is in a range between 0.07% or more and 0.20% or less. Preferably, the lower limit of the C content is 0.09% or more. More preferably, it is 0.10% or more, or still more preferably, 0.11% or more. Preferably, the upper limit of the C content is 0.19% or less. More preferably, it is 0.18% or less, or still more preferably, 0.16% or less.

Si: 0.60% or More and 1.65% or Less

Silicon (Si) is an element having an effect of preventing the occurrence of cracking by lowering the wettability of the grain boundary by its presence on the grain boundary, and preventing grain boundary corrosion by zinc during spot welding. In order to obtain this effect, it is necessary that Si content is at least 0.60%. Meanwhile, when the Si content exceeds 1.65%, adverse effects on chemical convertibility and plating property are noticeable, thereby application to an automotive member being difficult. Therefore, Si content is in a range between 0.60% or more and 1.65% or less. Preferably, the lower limit of the Si content is 0.70% or more. More preferably, the lower limit of the Si content is 0.80% or more, or still more preferably, 0.90% or more. Preferably, the upper limit of the Si content is 1.60% or less. More preferably, the upper limit of the Si content is 1.55% or less, or still more preferably, 1.50% or less.

Mn: 1.8% or More and 3.5% or Less

As with Si, manganese (Mn) is an element having an effect of preventing grain boundary corrosion in spot welding by its presence on the grain boundary of the tempered martensite. In order to obtain this effect, it is necessary that the Mn content is 1.8% or more. Meanwhile, when the Mn content exceeds 3.5%, the chemical convertibility and the plating property deteriorate. Therefore, the Mn content is 1.8% or more and 3.5% or less. Preferably, the lower limit of the Mn content is 1.9% or more. More preferably, the lower limit of the Mn content is 2.1% or more, or still more preferably, 2.3% or more. Preferably, the upper limit of the Mn content is 3.2% or less. More preferably, the upper limit of the Mn content is 3.0% or less, or still more preferably, 2.9% or less.

P: 0.05% or Less

Phosphorus (P) is an element that induces low temperature embrittlement, and thus, P is an element that causes cracking during cooling at the time of welding. Therefore, from the viewpoint of weldability, it is preferable to reduce the P content as much as possible, and according to aspects of the present invention, up to 0.08% of P content is allowed. Preferably, the P content is 0.03% or less. While it is preferable to reduce the P content as much as possible or P may not be contained at all, 0.002% of P may inevitably be mixed through the process of production.

S: 0.005% or Less

Sulfur (S) forms coarse sulfides in steel which are elongated during hot rolling to form wedge-shaped inclusions that adversely affect weldability. Therefore, it is preferable to reduce the S content as much as possible. According to aspects of the present invention, up to 0.005% can be allowed, and accordingly, the upper limit of S content is 0.005%. Preferably, the S content is 0.003% or less. While it is preferable to reduce the S content as much as possible or S may not be contained at all, 0.0002% of S may inevitably be mixed through the process of production.

Al: 0.08% or Less

When Aluminum (Al) is added as a deoxidizer at the stage of steelmaking, it is preferable that Al content be 0.02% or more. More preferably, the Al content is 0.03% or more. Meanwhile, Al forms coarse oxide which causes weldability to deteriorate. Therefore, the upper limit of the Al content is 0.08%. Preferably, the Al content is 0.07% or less. More preferably, the Al content is 0.06% or less, or still more preferably, 0.05% or less.

N: 0.0060% or Less,

Nitrogen (N) is a detrimental element that degrades cold aging properties to cause unexpected cracking, or causes micro voids at the time of spot welding to degrade weldability. Therefore, although it is desirable to reduce the N content as much as possible, up to 0.0060% can be allowed in accordance with aspects of the present invention. Preferably, the N content is 0.0050% or less. More preferably, the N content is 0.0050% or less, or still more preferably, 0.0040% or less. While it is preferable to reduce the N content as much as possible or N may not be contained at all, 0.0005% of N may inevitably be mixed through the process of production.

While the basic composition according to aspects of the present invention is described above, the following components (optional components) may be additionally contained.

One or Two or More Selected from V: 0.001% or More and 1% or Less, Ti: 0.001% or More and 0.3% or Less, and Nb: 0.001% or More and 0.3% or Less V, Ti and Nb are elements that combine with C to form fine carbides, thereby contributing to increasing the strength of the steel sheet. Meanwhile, when excessively contained, the elements precipitate into coarse carbides, resulting in deterioration of weldability. In view of the above, V: 0.001% or more and 1% or less, Ti: 0.001% or more and 0.3% or less, and Nb: 0.001% or more and 0.3% or less. Preferably, the lower limit of the V content is 0.005% or more. More preferably, the lower limit of the V content is 0.050% or more, or still more preferably, 0.100% or more. Preferably, the upper limit of the V content is 0.6% or less. More preferably, the upper limit of the V content is 0.5% or less, or still more preferably, 0.4% or less. Preferably, the lower limit of the Ti content is 0.005% or more. More preferably, the lower limit of the Ti content is 0.010% or more, or still more preferably, 0.020% or more. Preferably, the upper limit of the Ti content is 0.2% or less. More preferably, the upper limit of the Ti content is 0.15% or less, or still more preferably, 0.12% or less. Preferably, the lower limit of the Nb content is 0.005% or more. More preferably, the lower limit of the Nb content is 0.010% or more, or still more preferably, 0.020% or more. Preferably, the upper limit of the Nb content is 0.15% or less. More preferably, the upper limit of the Nb content is 0.12% or less, or still more preferably, 0.08% or less.

One or two or more selected from Cr: 0.001% or more and 1.0% or less, Mo: 0.001% or more and 1.0% or less, Ni: 0.001% or more and 1.0% or less, B: 0.0001% or more and 0.0050% or less, and Sb: 0.001% or more and 0.050% or less Cr, Mo and Ni are elements which have an effect of contributing to increasing the strength of the steel sheet and increasing the atomic concentration on the grain boundary of the tempered martensite to improve spot weldability. Meanwhile, when these elements are excessively added, the transformation point greatly changes. Therefore, a desired steel structure cannot be obtained, and the chemical convertibility and the plating property deteriorate. B and Sb are elements that are present on the grain boundary and increase the surface energy required for crack generation, thereby effectively preventing crack generation in spot welding. When B or Sb is added excessively, the effect is saturated, leading to waste of added elements. In view of the above, Cr: 0.001% or more and 1.0% or less, Mo: 0.001% or more and 1.0% or less, Ni: 0.001% or more and 1.0% or less, B: 0.0001% or more and 0.0050% or less, Sb: 0.001% or more and 0.050% or less. Preferably, the lower limit of the Cr content is 0.010% or more. More preferably, the lower limit of the Cr content is 0.050% or more, or still more preferably, 0.100% or more. Preferably, the upper limit of the Cr content is 0.8% or less. More preferably, the upper limit of the Cr content is 0.7% or less, or still more preferably, 0.6% or less. Preferably, the lower limit of the Mo content is 0.010% or more. More preferably, the lower limit of the Mo content is 0.050% or more, or still more preferably, 0.100% or more. Preferably, the upper limit of the Mo content is 0.6% or less. More preferably, the upper limit of the Mo content is 0.5% or less, or still more preferably, 0.4% or less. Preferably, the lower limit of the Ni content is 0.010% or more. More preferably, the lower limit of the Ni content is 0.020% or more, or still more preferably, 0.030% or more. Preferably, the upper limit of the Ni content is 0.5% or less. More preferably, the upper limit of the Ni content is 0.4% or less, or still more preferably, 0.3% or less. Preferably, the lower limit of the B content is 0.0003% or more. More preferably, the lower limit of the B content is 0.0007% or more, or still more preferably, 0.0010% or more. Preferably, the upper limit of the B content is 0.0030% or less. More preferably, the upper limit of the B content is 0.0025% or less, or still more preferably, 0.0020% or less. Preferably, the lower limit of the Sb content is 0.005% or more. More preferably, the lower limit of the Sb content is 0.008% or more, or still more preferably, 0.010% or more. Preferably, the upper limit of the Sb content is 0.040% or less. More preferably, the upper limit of the Sb content is 0.030% or less, or still more preferably, 0.020% or less.

One or Two or More Selected from REM, Sn, Mg, and Ca: 0.0001% or More and 0.1% or Less in Total REM, Sn, Mg and Ca are elements that improve spot weldability by spheroidizing inclusions. Meanwhile, when these elements are added excessively, the effect is saturated, leading to waste of added elements. In view of the above, one or two or more selected from REM, Sn, Mg, and Ca is 0.0001% or more and 0.1% or less in total. Preferably, the lower limit of one or two or more selected from REM, Sn, Mg, and Ca in total is 0.0005% or more. More preferably, it is 0.0010% or more, or still more preferably, 0.0020% or more. Preferably, the upper limit of one or two or more selected from REM, Sn, Mg, and Ca in total is 0.05% or less. More preferably, it is 0.03% or less, or still more preferably, 0.02% or less.

The balance other than the components mentioned above is Fe and unavoidable impurities. In addition, when the optional component described above is contained in an amount less than the lower limit, the optional element is regarded as being contained as an unavoidable impurity.

<Steel Structure>

Next, the steel structure of a steel sheet according to aspects of the present invention will be described. The steel structure of a steel sheet according to aspects of the present invention contains, in terms of area fraction, ferrite of 30% or less (including 0%), tempered martensite of 70% or more (including 100%), and the balance other than the ferrite and the tempered martensite of 10% or less (including 0%) in total. In addition, the average grain size of tempered martensite is 5 μm or less, the average particle size of iron-based carbides precipitated on grain boundaries of tempered martensite is 100 nm or less, and the total Si and Mn on grain boundaries of tempered martensite is 5% or more in terms of atomic concentration. In addition, "atom %" which is a unit of atom concentration is sometimes simply referred to as "%".

Area Fraction of Ferrite: 30% or Less (Including 0%)

There are cases where the element concentration on the grain boundary decreases depending on the generation temperature of ferrite, and it is difficult to stably improve the spot weldability when a large amount of ferrite is formed. In addition, although a hard phase such as tempered martensite is indispensable to obtain a tensile strength of 900 MPa or higher, when a large amount of ferrite, which is a soft phase, is generated, stress concentration occurs in the interface between ferrite and tempered martensite in the vicinity of the HAZ in spot welding, which causes cracking. Therefore, the area fraction of ferrite is 30% or less. Preferably, the area fraction of ferrite is 25% or less. More preferably, the area fraction of ferrite is 22% or less, or still more preferably, 20% or less. In addition, the area fraction of ferrite may be 0%. However, ferrite is contained in many cases, and the ferrite area fraction in that case is 1% or more or 3% or more.

Area Fraction of Tempered Martensite: 70% or More (Including 100%)

The tempered martensite has a structure in which 0.3 μm or less carbide is precipitated in a microstructure having lath structure. The tempered martensite suffers from less deterioration due to heat than quenched martensite which is not tempered, and thus causes less softening of the HAZ. Therefore, according to aspects of the present invention, the tempered martensite is Selected as a main steel structure. In order to obtain a tensile strength of 900 MPa or higher and also has excellent weldability, it is necessary that the tempered martensite is 70% or more in terms of area fraction. Preferably, the tempered martensite is 75% or more. More preferably, the tempered martensite is 77% or more, or still more preferably, 80% or more. While the area fraction of the tempered martensite may be 100%, components other than the tempered martensite are contained in many cases where the upper limit of the area fraction of tempered martensite is 98% or less or 96% or less.

Total Area Fraction of Structures Other than Ferrite and Tempered Martensite: 10% or Less (Including 0%)

As the structures other than ferrite and tempered martensite, bainite, quenched martensite, retained austenite, pearlite and the like can be mentioned. Since these structures decrease strength and degrade weldability, it is desirable to reduce them as much as possible. According to aspects of the present invention, up to 10% total area fraction of the structures other than ferrite and tempered martensite can be allowed. Preferably, the total area fraction is 7% or less, or more preferably, 5% or less, or still more preferably, 4% or less.

Average Grain Size of Tempered Martensite: 5 μm or Less

The grain boundary of tempered martensite is mainly eroded by zinc during spot welding. Therefore, when the grain boundary area of the tempered martensite is small, that is, when the tempered martensite is coarse, the surface energy at the time of occurrence of cracking becomes small, so that cracking is likely to occur. In order to increase the surface energy of the grain boundary, it is effective to increase the surface energy of the tempered martensite, and in order to obtain this effect, it is necessary that the average grain size of the tempered martensite is 5 μm or less. Preferably, the average grain size is 4 μm or less. More preferably, it is 3.5 μm or, less, or still more preferably, 3.0 μm or less. While the lower limit of the average grain size is not particularly limited and is preferably as small as possible, in the steel according to aspects of the present invention, an average grain size of 1 μm or more is generally obtained.

Average Particle Size of Iron-Based Carbides Precipitated on Grain Boundary of Tempered Martensite: 100 nm or Less Since the grain boundary is also a preferred site for precipitation of iron-based carbides, when coarse iron-based carbides are present, stress concentration occurs at the interface between the iron-based carbides and the matrix, which causes cracking during spot welding. If the carbide size (the average particle size of the carbide) is 100 nm or less, the weldability is not adversely affected. Preferably, the carbide size is 80 nm or less. More preferably, it is 70 nm or less, or still more preferably, 65 nm or less. According to aspects of the present invention, although the lower limit of the average particle size is not limited, iron-based carbides having an average particle size of 10 nm or more are precipitated in many cases. The 'iron-based carbide' means carbides such as η carbide, χ Carbide, ε carbide, or the like.

Average Particle Size of Carbide Containing V, Ti or Nb: 20 nm or Less

When one or two or more selected from V, Ti or Nb is contained as a selected element (optional element), since the carbide containing V, Ti or Nb has higher hardness rather than the iron-based carbide described above, when the carbide containing V, Ti or Nb is precipitated at the grain boundary, spot weldability is adversely affected as in the case of the iron-based carbide. According to aspects of the present invention, when these elements are contained, it is necessary to adjust the average particle size of not only the iron-based carbide, but also carbides containing V, Ti or Nb. V, Ti or Nb can be allowed as long as the average particle size of the carbide is 20 nm or less. Preferably, the average particle size is 15 nm or less. More preferably, the average particle size is 13 nm or less. Although the lower limit is not particularly limited, the average particle size is 0.8 nm or more in many cases.

Si and Mn on Grain Boundaries of Tempered Martensite in Total: 5% or More in Terms of Atomic Concentration Cracking due to grain boundary corrosion by zinc during spot welding is improved by preventing the grain boundary corrosion. For this purpose, it is effective to lower the wettability of grain boundaries. In order to obtain this effect, it is necessary that the total Si and Mn on the grain boundary of tempered martensite is 5% or more in terms of atomic concentration. Preferably, it is 7% or more. More preferably, it is 8% or more. In addition, the upper limit is not particularly limited, but is substantially 25%. In addition, the total atomic concentration is 15% or less in many cases.

Total Cr, Mo, Ni, B, and Sb on Grain Boundaries of Tempered Martensite: 5% or More in Terms of Atomic Concentration When one or two or more selected from Cr, Mo, Ni, B or Sb is contained as a selected element (optional element), in order to further improve the spot weldability, it is necessary that the total of Mo, Ni, B and Sb on grain boundaries of tempered martensite is 5% or more in terms of atomic concentration. Cr and Ni are effective elements for lowering the wettability of the grain boundary and hindering grain boundary corrosion by zinc. Mo, B and Sb have the effect of increasing the surface energy at the time of occurrence of cracking and thus preventing cracking. Preferably, the total atomic concentration of Cr, Mo, Ni, B and Sb is 7% or more. More preferably, it is 8% or more. In addition, the upper limit is not particularly limited, but is substantially 35%. In addition, the total atomic concentration is 20% or less in many cases.

<Coating Layer>

Next, the coating layer will be described. When a steel sheet according to aspects of the present invention is a steel sheet having a coating layer, without being limited to a specific type of the coating layer, examples may include a hot-dip coating layer, an electroplated layer, or the like. In addition, the composition of the coating layer is also not particularly limited, and accordingly, any general composition may be used. For example, the coating layer has a composition containing, in mass %, Fe: 20.0% or less, Al: 0.001% or more and 3.5% or less, and further containing 0 to 3.5% of one or two or more selected from Pb, Sb, Si, Sn, Mg, Mn, Ni, Cr, Co, Ca, Cu, Li, Ti, Be, Bi and REM in total, and the balance being Zn and unavoidable impurities. In addition, the coating layer may be an alloyed coating layer. In addition, in the case of the alloyed coating layer, the Fe content in the coating layer is generally 5.0% or more and 20% or less.

Properties of the steel sheet according to aspects of the present invention will be described. The method of measuring the properties is same as that which is described in the Examples. According to aspects of the present invention, a tensile strength is 900 MPa or higher. Preferably, the tensile strength is 980 MPa or higher. According to aspects of the present invention, the tensile strength is generally 1300 MPa or less. In addition, the elongation of the steel sheet in accordance with aspects of the present invention is generally 9% or more, or preferably, 11% or more. The upper limit is about 25% or less or about 20% or less. The yield strength is 600 MPa or higher, or preferably, 700 MPa or higher. The upper limit is generally 1100 MPa or less. In addition, when the spot weldability is evaluated by the method described in the Examples, according to aspects of the present invention, crack length is 0 μm and cracks do not occur or only small cracks of less than 10 μm occur. Further, El and YS are additional characteristics not directly related to the subject of aspects of the present invention.

<Method for Producing Steel Sheet>

Next, a method for producing a steel sheet according to aspects of the present invention will be described. The production condition slightly differs between the method for producing the steel sheet not having the coating layer and the method for producing the steel sheet having the coating layer. This is because the allowable range of production conditions slightly differs depending on whether the plating processing is performed or not. Hereinafter, a method for producing a steel sheet not having a coating layer and a method for producing a steel sheet having a coating layer will be described in order.

The method for producing the steel sheet (steel sheet not having coating layer) according to aspects of the present invention includes heating a steel material having the Composition described above at 1150° C. or higher and 1350° C. or lower, hot-rolling including rough rolling and finish rolling on the steel material at a finish rolling temperature of 820° C. or higher, and coiling at 350° C. or higher and 680° C. or lower (hot-rolling step). Next, a cold-rolling is performed (cold-rolling step). Subsequently, heating and retaining at 840° C. or higher for 30 seconds or more, and then cooling to 100° C. or lower at an average cooling rate of 200° C./s or more from a cooling starting temperature to a Ms point are performed. Re-heating and retaining the cooled steel material at 840° C. or higher for 30 seconds or more, and then cooling the re-heated steel material to (Ms point—100° C.) or lower at an average cooling rate of 20° C./s or more from a cooling starting temperature to a cooling stop temperature; and as necessary, heating or cooling the resulting cooled steel material and retaining the resulting steel material at 200° C. or higher and 400° C. or lower for 20 seconds or more and 1800 seconds or less are performed (annealing step). In addition, the Ms point refers to the martensitic transformation starting temperature.

The hot-rolling step includes a step of heating a steel material having the composition described above at 1150° C. or higher and 1350° C. or lower, hot-rolling including rough rolling and finish rolling the steel material at a finish rolling temperature of 820° C. or higher, and coiling the resulting hot-rolled steel material at 350° C. or higher and 680° C. or lower.

There are no particular restrictions on the smelting method for producing the steel material described above, and a known smelting method such as a converter, electric furnace or the like may be adopted. In addition, secondary refining may be performed in a vacuum degassing furnace. After that, from the viewpoint of productivity and quality problems, it is preferable to cast into a slab (steel material) by continuous casting method. Further, slabs may be formed by a known casting method such as ingot-slabbing method, or thin slab continuous casting method.

Heating Temperature of Steel Material: 1150° C. or Higher and 1350° C. or Lower

According to aspects of the present invention, it is necessary to heat the steel material to prepare the steel structure of the steel material into a substantially homogeneous austenite phase prior to rough rolling. In addition, in order to prevent the formation of coarse inclusions, it is important to control the heating temperature. When the heating temperature is lower than 1150° C., it is impossible to obtain the desired finish rolling temperature. Meanwhile, if the heating temperature exceeds 1350° C., the scale loss increases and damage to the furnace body of the heating furnace increases. Therefore, the heating temperature of the steel material is 1150° C. or higher and 1350° C. or lower. Preferably, a lower limit of the heating temperature is 1180° C. or higher. Preferably, an upper limit of the heating temperature is 1320° C. or lower. In addition, the rough rolling conditions for the rough rolling described above after heating are not particularly limited.

During slab heating, segregation generated during casting remains, and upon subsequent rolling, the segregation changes to a band-like uneven structure (or texture) in the sheet thickness direction. Since this structure can have an adverse effect on weldability in some cases, it is more desirable to satisfy Expression (1) below in order to reduce the effect of segregation.

[Expression 1]

$$\ln t - \frac{31270}{T+273} + 11.29 \geq 0 \quad (1)$$

where, t is a heating time (unit: seconds), and T is a heating temperature (unit: ° C.). Expression (1) is an experimentally determined conditional expression for reducing the adverse effect of Mn segregation that causes band-like uneven texture in slab heating. When the left side of Expression (1) is 0 or more, Mn diffuses during slab heating such that adverse effects on weldability due to formation of band-like uneven texture are reduced. In addition, while the upper limit of the left side of the Expression (1) is not particularly limited, in many cases, it is 1.00 or less in consideration of producibility.

Finish Rolling Temperature: 820° C. or Higher

When a finish rolling temperature is lower than 820° C., transformation from austenite to ferrite starts during rolling, and the local strength of the steel sheet fluctuates, resulting in degraded accuracy of the sheet thickness by the cold rolling in the subsequent step. Therefore, the finish rolling temperature is 820° C. or higher. Preferably, it is 840° C. or higher. More preferably, it is 850° C. or higher. In addition, the upper limit of the finish rolling temperature is substantially 1020° C. due to restrictions associated with the production facilities, but not particularly limited thereto. Preferably, the upper limit is 1000° C. or lower. More preferably, the upper limit is 950° C. or lower.

Coiling Temperature: 350° C. or Higher and 680° C. or Lower

When the coiling temperature is lower than 350° C., a shape of a hot-rolled sheet is degraded, and accuracy of the sheet thickness after cold rolling deteriorates. When the coiling temperature exceeds 680° C., an oxide film which is not removable by pickling is formed on the hot rolled sheet surface, thus impairing the surface appearance after cold rolling. Therefore, the coiling temperature is in a range of 350° C. or higher and 680° C. or lower. Preferably, a lower limit of the coiling temperature is 380° C. or higher. More preferably, it is 400° C. or higher. Preferably, an upper limit of the coiling temperature is 650° C. or lower. More preferably, the coiling temperature is 630° C. or lower. When V, Ti and Nb are added, in order to make the carbide size 20 nm or less, the coiling temperature is preferably 520° C. or lower.

The cold-rolling step as a subsequent step is a step of cold rolling the hot-rolled sheet after the hot-rolling step. In order to obtain a desired sheet thickness, it is necessary to cold roll the hot-rolled sheet after the hot-rolling step. The cold rolling is generally carried out after pickling, and generally-used conditions may be used for the pickling.

The rolling ratio for the cold rolling is generally 20% to 80%, but not particularly limited thereto. Preferably, the lower limit is 30% or more. Preferably, the upper limit is 75% or less.

The subsequent annealing step includes retaining at 840° C. or higher for 30 seconds or more after the cold-rolling step, then cooling to 100° C. or lower at an average cooling rate of 200° C./s or more from a cooling starting temperature to the Ms point; re-heating and retaining at 840° C. or higher for 30 seconds or more, then cooling to (Ms point—100° C.) or lower at an average cooling rate of 20° C./s or more from a cooling starting temperature to the (Ms point—100° C.), and as necessary heating or cooling, and retaining at 200° C. or higher and 400° C. or lower for 20 seconds or more and 1800 seconds or less.

Retaining at 840° C. or Higher for 30 Seconds or More

"Retaining at 840° C. or higher for 30 seconds or more" is important for eliminating the influence of the recrystallized structure generated from the structure after cold rolling and for increasing the concentrations of Cr, Mo, Ni, B and Sb in addition to Si and Mn on the prior austenite grain boundary that corresponds to the tempered martensite grain boundary. In order to increase the concentration of Si, Mn, and the like on the grain boundary after obtaining a completely recrystallized structure, it is necessary to retain at 840° C. or higher for 30 seconds or more. When V, Ti and Nb are added, in order to make the carbide size 20 nm or less, the retaining time is preferably 300 seconds or less. Retaining at 840° C. or higher for 50 seconds or more and 280 seconds or less is more preferable. Retaining at 840° C. or higher for 70 seconds or more and 250 seconds or less is still more preferable. In addition, the heating temperature is generally 880° C. or lower.

Cooling to 100° C. or Lower at Average Cooling Rate of 200° C./s or More from Cooling Starting Temperature to Ms Point In the cooling in this step, it is necessary to prevent the grain boundary movement at the austenite/ferrite interface. For that purpose, it is necessary to cool at an average cooling rate of 200° C./s or more from a cooling starting temperature to the Ms point. In order to prevent the formation of ferrite in the cooling process, it is more preferable to set the cooling starting temperature at 820° C. or higher and cool to room temperature by water cooling. The "room temperature" refers to a temperature of 0° C. or higher and 50° C. or lower. The average cooling rate is generally 800° C./s or less. In addition, heating is performed to 840° C. or higher before cooling, but the heating temperature may or may not coincide with the cooling starting temperature. For example, the temperatures may not coincide with each other when the temperature is decreased between end of heating and start of cooling. Further, the cooling rate from the Ms point to the cooling stop temperature is not particularly limited.

Re-Heating and Retaining at 840° C. or Higher for 30 Seconds or More

Annealing once at 840° C. or higher into martensite and second time heating at 840° C. or higher provides the effect of preventing the coarsening of the prior austenite grains and decreasing of the grain size of the tempered martensite, while effectively increasing the concentration of elements such as Si and Mn on the grain boundary of the prior austenite. After annealing is completed, it is necessary to retain at 840° C. or higher for 30 seconds or more, because it is necessary to make the structure in which the austenite is main component. Meanwhile, while the upper limit of the retaining time is not particularly limited, when the retaining time at 840° C. or higher exceeds 300 seconds, the austenite grains become coarse, and fine tempered martensite may not be obtained in some cases. Therefore, the retaining at 840° C. or higher is preferably for 280 seconds or less. Retaining at 840° C. or higher for 50 seconds or more and 200 seconds or less is preferable. In addition, the heating temperature is generally 900° C. or lower.

Cooling to (Ms point—100° C.) or lower at average cooling rate of 20° C./s or more from cooling starting temperature to (Ms Point—100° C.)

It is necessary to almost complete the transformation from austenite to martensite in this cooling step. When the average cooling rate is low, bainite and ferrite are generated during the cooling process, and the concentration at the grain boundary becomes smaller due to grain boundary migration, which is thus necessary to be prevented as much as possible. For that purpose, it is necessary to cool at the average cooling rate of 20° C./s or more from the cooling starting temperature to (Ms point—100° C.). In addition, when the cooling stop temperature is high, tempered martensite is not generated in the subsequent step, and a desired structure cannot be obtained. In view of the above, it is necessary to cool to at least (Ms point—100° C.) or lower. Preferably, a cooling to 240° C. or lower is performed at an average cooling rate of 30° C./s or more from the cooling starting temperature to (Ms point—100° C.), and the cooling starting temperature is 820° C. or higher. The heating temperature before the start of the cooling and the cooling starting temperature may not coincide with each other. For example, the temperature after heating may slightly decrease until the cooling starts. The average cooling rate is generally 60° C./s or less.

Retaining at 200° C. or Higher and 400° C. or Lower for 20 Seconds or More and 1800 Seconds or Less In order to temper formed martensite, retaining within a predetermined temperature range is necessary. When the retaining temperature is lower than 200° C., tempering does not proceed and formability is poor for practical use. When the temperature is higher than 400° C., coarse iron-based carbides are formed on the tempered martensite grain boundary, which decreases weldability. Therefore, the retaining temperature range is 200° C. or higher and 400° C. or lower. When the retaining time is less than 20 seconds, the tempering does not proceed sufficiently. When it is more than 1800 seconds, the iron-based carbides become coarser. Therefore, the retaining time is 20 seconds or more and 1800 seconds or less. Retaining at 200° C. or higher and 400° C. or lower for 50 seconds or more and 1500 seconds or less is preferable. In addition, when the cooling stop temperature in the cooling before the retaining described above is lower than 200° C., heating is required. Even when the cooling stop temperature is in the range of 200° C. to 400° C., heating or cooling may be performed as needed.

Next, a method for producing a steel sheet having a coating layer will be described. Since the steps are same as those of the method for producing the steel sheet not having the coating layer until the cold rolling, redundant explanation thereof will be omitted. The method for producing a steel sheet having a coating layer includes a step of heating and retaining at 840° C. or higher for 30 seconds or more, then cooling to 100° C. or lower at an average cooling rate of 200° C./s or more from a cooling starting temperature to 200° C.; re-heating and retaining at 840° C. or higher for 10 seconds or more and 150 seconds or less, then cooling to 260° C. or lower at an average cooling rate of 20° C./s or more from a cooling starting temperature to the 260° C.; and, heating or cooling as necessary, retaining at 200° C. or higher and 400° C. or lower for 20 seconds or more and 150 seconds or less, and a step of subjecting to a coating treatment by immersing in a plating bath, or subjecting to alloying treatment in addition to the coating treatment.

Retaining at 840° C. or Higher for 30 Seconds or More

"Retaining at 840° C. or higher for 30 seconds or more" is important for eliminating the influence of the recrystallized structure generated from the structure after cold rolling and for increasing the concentrations of Cr, Mo, Ni, B and Sb in addition to Si and Mn in the prior austenite grain boundary that corresponds to the tempered martensite grain boundary. In order to increase the concentration of Si, Mn, and the like in the grain boundary after obtaining a completely recrystallized structure, it is necessary to retain at 840° C. or higher for 30 seconds or more. When V, Ti and Nb are added, in order to make the carbide size 20 nm or less, the retaining time is preferably 300 seconds or less. More preferably, it is 840° C. or higher for 50 seconds or more and 280 seconds or less. In addition, the heating temperature is generally 880° C. or lower.

Cooling to 100° C. or lower at average cooling rate of 200° C./s or more from cooling starting temperature to 200° C.

The state of distribution of the elements in the grain boundary generated by the above annealing is frozen by changing the austenite into the structure in which martensite is the main component, and meanwhile, it is necessary to prevent the formation of coarse iron-based carbide. For that purpose, it is necessary to perform cooling at an average cooling rate of 200° C./s or more from the cooling starting temperature to 200° C. In order to prevent the formation of ferrite, it is more preferable to set the cooling starting temperature to 820° C. or higher and to cool to room temperature by water cooling. The "room temperature" as used herein refers to a temperature of 0° C. or higher and 50° C. or lower. The average cooling rate is generally 800° C./s or less. In addition, heating to 840° C. or higher is performed before cooling, but the heating temperature may or may not coincide with the cooling starting temperature. For example, the temperatures may not coincide with each other when the temperature is decreased from end of heating to start of cooling. Further, the cooling rate from 200° C. to the cooling stop temperature is not particularly limited.

Reheating and Retaining at 840° C. or Higher for 10 Seconds or More and 150 Seconds or Less Annealing once at 840° C. or higher, then changing into martensite and secondly heating at 840° C. or higher provides the effect of preventing the coarsening of the prior austenite grains and the decrease of the grain size of the tempered martensite, while effectively increasing the concentration of elements such as Si and Mn in the grain boundary of the prior austenite. It is necessary to retain at 840° C. or higher for 10 seconds or more, because it is necessary to make the structure in which the austenite is main component at the time when annealing is completed. Meanwhile, with the retaining at 840° C. or higher for the retaining time of 150 seconds or more, the austenite grains become coarse, and fine tempered martensite may not be obtained. Therefore, the retaining at 840° C. or higher for 150 seconds or less is performed. The retaining at 840° C. or higher for 20 seconds or more and 130 seconds or less is preferable. In addition, the heating temperature is generally 900° C. or lower.

Cooling to 260° C. or lower at average cooling rate of 20° C./s or more from cooling starting temperature to 260° C.

It is necessary to almost complete the transformation from austenite to martensite in this cooling step. When the average cooling rate is low, bainite and ferrite are generated during the cooling process, and the concentration at the grain boundary becomes smaller due to grain boundary migration, which must be prevented as much as possible. For that purpose, it is necessary to cool at the average cooling rate of 20° C./s or more from the cooling starting temperature to 260° C. In addition, when the cooling stop temperature is high, tempered martensite is not generated in the subsequent step, and a desired structure cannot be obtained. In view of the above, it is necessary to cool to at least 260° C. or lower. Preferably, the cooling to 240° C. or lower is performed at an average cooling rate of 30° C./s or more from the cooling starting temperature to 260° C., and the cooling starting temperature is 820° C. or higher. The heating temperature before the start of the cooling and the cooling starting temperature may not coincide with each other. For example, the temperature after heating may slightly decrease until the cooling starts. The average cooling rate is generally 60° C./s or less.

Retaining at 200° C. or Higher and 400° C. or Lower for 20 Seconds or More and 150 Seconds or Less In order to temper the generated martensite, retaining within a predetermined temperature range is necessary. When the retaining temperature is lower than 200° C., tempering does not proceed and formability is not available in practical use. When the temperature is higher than 400° C., coarse iron-based carbides are formed on the tempered martensite grain boundary, which causes decrease of weldability. Therefore, the retaining temperature range is between 200° C. or higher and 400° C. or lower. When the retaining time is less than 20 seconds, the tempering does not proceed sufficiently. When it is more than 150 seconds, the iron-based carbide becomes coarser. Therefore, the retaining time is 20 seconds or more and 150 seconds or less. Retaining at 200° C. or higher and 400° C. or lower for 50 seconds or more and 130 seconds or less is preferable. In addition, when the cooling stop temperature in the cooling before the retaining described above is lower than 200° C., heating is necessary. Even when the cooling stop temperature is in the range of 200° C. to 400° C., heating and cooling may be performed as needed.

The plating is performed. As a result, a steel sheet having a coating layer can be produced. The specific method of the coating treatment is not particularly limited, and may be either hot-dip plating or electroplating.

In the case of hot-dip plating, due to immersion in a plating bath, and also alloying that is performed as necessary, the steel sheet is temporarily exposed to a temperature higher than 400° C. In consideration of this influence, it is necessary to adjust the time of retaining at 200° C. or more and 400° C. or lower before coating. Therefore, when manufacturing a steel sheet having a coating layer, the retaining time is 20 seconds or more and 150 seconds or less. Preferably, it is 30 seconds or more and 130 seconds or less.

Examples

Hot-rolling step was performed on a steel material having a composition shown in Table 1 and having a thickness of 250 mm under hot rolling conditions shown in Table 2 to obtain a hot rolled steel sheet, the hot-rolled steel sheet was subjected to cold rolling in which the cold rolling ratio is 29% or more and 68% or less to obtain a cold-rolled steel sheet, and then the cold-rolled steel sheet was subjected to annealing under the conditions shown in Table 2 on a continuous annealing line or continuous hot-dip plating line. The coating treatment and, if necessary, alloying treatment were then carried out. In this Example, the temperature of the plating bath (plating composition: Zn-0.13 mass % Al) used for immersion in the continuous molten plating line was 460° C. and coating weight of GI material (hot-dip plated steel sheet) and of GA material (alloyed hot-dip plated steel sheet) were 45 to 65 g/m² per side, and an amount of Fe contained in the coating layer of the GA material was in a range of 6 to 14 mass %.

The Ms point was obtained by the Expression (2).

$$\text{Ms point (° C.)}=561-474\times[C]-33\times[Mn]-17\times[Ni]-17\times[Cr]-21\times[Mo]. \quad (2)$$

where, [M] (M=C, Mn, Ni, Cr, Mo) is the weight concentration of alloying elements.

TABLE 1

| Steel | Chemical Composition (mass %) | | | | | | | | | | |
|---|---|---|---|---|---|---|---|---|---|---|---|
| No. | C | Si | Mn | P | S | Al | N | V | Ti | Nb | Cr |
| A | 0.13 | 1.25 | 2.65 | 0.01 | 0.003 | 0.03 | 0.0026 | | | | |
| B | 0.13 | 1.52 | 2.82 | 0.01 | 0.002 | 0.03 | 0.0025 | | | | |
| C | 0.18 | 1.53 | 3.15 | 0.01 | 0.002 | 0.03 | 0.0029 | | | | |
| D | 0.14 | 1.15 | 2.71 | 0.01 | 0.001 | 0.03 | 0.0025 | 0.34 | | | |
| E | 0.13 | 1.45 | 2.77 | 0.01 | 0.002 | 0.04 | 0.0032 | | 0.11 | | |
| F | 0.12 | 1.51 | 2.74 | 0.02 | 0.002 | 0.03 | 0.0022 | | | 0.07 | |
| G | 0.09 | 1.15 | 2.25 | 0.01 | 0.001 | 0.04 | 0.0020 | | | | 0.68 |
| H | 0.11 | 1.20 | 2.21 | 0.02 | 0.001 | 0.03 | 0.0020 | | | | |
| I | 0.10 | 1.15 | 2.13 | 0.02 | 0.001 | 0.05 | 0.0032 | | | | 0.15 |
| J | 0.13 | 0.91 | 2.34 | 0.01 | 0.001 | 0.03 | 0.0022 | | | | 0.36 |

TABLE 1-continued

| | | | | | | | | | | |
|---|---|---|---|---|---|---|---|---|---|---|
| K | 0.17 | 1.52 | 2.97 | 0.01 | 0.002 | 0.04 | 0.0024 | | | |
| L | 0.18 | 1.53 | 2.75 | 0.02 | 0.002 | 0.05 | 0.0032 | | 0.02 | 0.07 |
| M | 0.09 | 1.01 | 2.34 | 0.02 | 0.001 | 0.03 | 0.0033 | | 0.02 | 0.35 |
| N | 0.11 | 1.53 | 2.75 | 0.02 | 0.003 | 0.03 | 0.0034 | 0.10 | 0.03 | 0.02 | 0.31 |
| O | <u>0.06</u> | 1.31 | 2.32 | 0.02 | 0.002 | 0.03 | 0.0030 | | | |
| P | 0.13 | <u>0.23</u> | 2.75 | 0.02 | 0.001 | 0.05 | 0.0020 | | | 0.21 |
| Q | 0.12 | 1.06 | <u>1.55</u> | 0.01 | 0.002 | 0.05 | 0.0020 | | | |

| Steel No. | Chemical Composition (mass %) | | | | Ms Point ° C. | Remarks |
|---|---|---|---|---|---|---|
| | Mo | Ni | B | Sb | Others | | |
| A | | | | | | 412 | Example |
| B | | | | | | 406 | Example |
| C | | | | | | 372 | Example |
| D | | | | | | 405 | Example |
| E | | | | | | 408 | Example |
| F | | | | | | 414 | Example |
| G | | | | | | 433 | Example |
| H | 0.34 | | | | | 429 | Example |
| I | 0.2 | | | | | 437 | Example |
| J | 0.11 | | | | | 414 | Example |
| K | 0.26 | 0.03 | | | | 376 | Example |
| L | 0.25 | 0.04 | 0.0015 | | | 378 | Example |
| M | | | | 0.05 | REM: 0.002 Ca: 0.001 | 435 | Example |
| N | 0.43 | 0.31 | 0.0012 | 0.01 | Sn: 0.01 Mg: 0.02 | 399 | Example |
| O | | | | | | 456 | Comparative example |
| P | | | | | | 405 | Comparative example |
| Q | 0.28 | 0.35 | | | | 441 | Comparative example |

Values outside the range of the present invention are underlined.

TABLE 2

| Steel sheet No. | Steel | Surface | Hot rolling process | | | | Cold rolling reduction rate (%) | Annealing process | | | | |
|---|---|---|---|---|---|---|---|---|---|---|---|---|
| | | | Slab heating temp (° C.) | Left side of Expression (1) | Finish rolling finishing temp (° C.) | Coiling temp (° C.) | | Heating temp (° C.) | Re-heat retaining time (s) | Cooling starting temp (° C.) | Cooling rate (° C./s) ※1 | Cooling stop temp (° C.) |
| 1 | A | CR | 1260 | 0.05 | 920 | 630 | 60 | 841 | 36 | 835 | 291 | 17 |
| 2 | | GI | 1230 | 0.10 | 910 | 610 | 53 | 861 | 173 | 844 | 667 | 29 |
| 3 | | GA | 1270 | 0.35 | 930 | 540 | 66 | 845 | 189 | 837 | 461 | 39 |
| 4 | | CR | 1230 | 0.24 | 850 | 480 | 65 | <u>812</u> | 117 | 801 | 265 | 23 |
| 5 | | CR | 1250 | 0.33 | 920 | 650 | 68 | 860 | <u>18</u> | 842 | 252 | 36 |
| 6 | | CR | 1230 | 0.40 | 880 | 500 | 40 | 860 | 263 | 846 | <u>45</u> | 22 |
| 7 | | CR | 1240 | 0.10 | 840 | 480 | 42 | 864 | 260 | 848 | <u>655</u> | 28 |
| 8 | | CR | 1260 | 0.40 | 880 | 620 | 51 | 863 | 247 | 848 | 348 | 34 |
| 9 | | GA | 1240 | 0.26 | 880 | 500 | 53 | 865 | 102 | 844 | 335 | 35 |
| 10 | | CR | 1230 | 0.28 | 910 | 550 | 38 | 846 | 145 | 836 | 519 | 31 |
| 11 | | CR | 1260 | 0.39 | 870 | 520 | 29 | 845 | 319 | 839 | 345 | 10 |
| 12 | | GA | 1240 | 0.15 | 850 | 610 | 40 | 841 | 166 | 831 | 438 | 23 |
| 13 | B | CR | 1230 | 0.25 | 860 | 540 | 66 | 852 | 158 | 836 | 539 | 37 |
| 14 | | GI | 1240 | 0.17 | 870 | 560 | 62 | 847 | 203 | 835 | 425 | 32 |
| 15 | | GA | 1240 | 0.08 | 930 | 570 | 63 | 859 | 216 | 840 | 620 | 35 |
| 16 | C | CR | 1270 | 0.34 | 930 | 570 | 43 | 849 | 87 | 837 | 639 | 21 |
| 17 | | GI | 1230 | 0.13 | 930 | 460 | 68 | 843 | 326 | 838 | 562 | 29 |
| 18 | | GA | 1240 | 0.22 | 840 | 500 | 67 | 846 | 140 | 834 | 514 | 15 |
| 19 | D | CR | 1240 | 0.07 | 900 | 490 | 46 | 848 | 105 | 838 | 636 | 33 |
| 20 | | GI | 1260 | 0.19 | 840 | 480 | 40 | 853 | 222 | 840 | 494 | 22 |
| 21 | | GA | 1230 | 0.30 | 870 | 470 | 32 | 842 | 293 | 837 | 259 | 33 |
| 22 | E | CR | 1230 | 0.17 | 870 | 490 | 58 | 852 | 78 | 839 | 487 | 17 |
| 23 | | GI | 1230 | 0.39 | 870 | 500 | 65 | 844 | 72 | 834 | 639 | 27 |
| 24 | | GA | 1270 | 0.13 | 880 | 510 | 64 | 844 | 161 | 832 | 397 | 33 |
| 25 | F | CR | 1230 | 0.40 | 860 | 480 | 56 | 846 | 144 | 833 | 288 | 18 |

TABLE 2-continued

| | | | | | | | | | | |
|---|---|---|---|---|---|---|---|---|---|---|
| 26 | | GI | 1260 | 0.30 | 850 | 500 | 45 | 860 | 262 | 844 | 278 | 32 |
| 27 | | GA | 1230 | 0.21 | 870 | 520 | 63 | 842 | 250 | 832 | 361 | 30 |
| 28 | G | CR | 1240 | 0.16 | 900 | 460 | 67 | 853 | 138 | 838 | 568 | 37 |
| 29 | | GI | 1260 | 0.14 | 860 | 640 | 33 | 854 | 127 | 838 | 444 | 25 |
| 30 | | GA | 1250 | 0.40 | 910 | 590 | 52 | 864 | 315 | 848 | 270 | 21 |

| | | | Annealing process | | | | | | |
|---|---|---|---|---|---|---|---|---|---|
| Steel sheet No. | Steel | Surface | Re-heating temp (° C.) | Re-heating retaining time (S) | Cooling starting temp (° C.) * | Cooling rate (° C./s) * ※2 | Cooling stop temp (° C.) * | Heating temp. for tempering (° C.) | Retaining time for tempering (s) | Remarks |
| 1 | A | CR | 851 | 105 | 839 | 35 | 178 | 270 | 732 | Ex. |
| 2 | | GI | 853 | 64 | 837 | 34 | 160 | 290 | 53 | Ex. |
| 3 | | GA | 850 | 24 | 837 | 49 | 201 | 230 | 86 | Ex. |
| 4 | | CR | 853 | 74 | 837 | 33 | 182 | 260 | 952 | Com. Ex. |
| 5 | | CR | 865 | 99 | 848 | 42 | 182 | 370 | 110 | Com. Ex. |
| 6 | | CR | 841 | 45 | 834 | 46 | 180 | 260 | 154 | Com. Ex. |
| 7 | | CR | 826 | 105 | 810 | 47 | 174 | 370 | 735 | Com. Ex. |
| 8 | | CR | 841 | 5 | 834 | 27 | 187 | 340 | 472 | Com. Ex. |
| 9 | | GA | 854 | 362 | 834 | 29 | 204 | 360 | 83 | Com. Ex. |
| 10 | | CR | 859 | 37 | 835 | 42 | 196 | 460 | 120 | Com. Ex. |
| 11 | | CR | 859 | 46 | 842 | 33 | 193 | 250 | 2540 | Com. Ex. |
| 12 | | GA | 846 | 35 | 838 | 26 | 198 | 340 | 198 | Com. Ex. |
| 13 | B | CR | 861 | 71 | 845 | 39 | 180 | 310 | 695 | Ex. |
| 14 | | GI | 862 | 117 | 836 | 46 | 161 | 350 | 104 | Ex. |
| 15 | | GA | 841 | 41 | 836 | 30 | 170 | 290 | 74 | Ex. |
| 16 | C | CR | 853 | 74 | 839 | 48 | 168 | 260 | 665 | Ex. |
| 17 | | GI | 863 | 40 | 840 | 35 | 187 | 380 | 63 | Ex. |
| 18 | | GA | 848 | 98 | 838 | 43 | 186 | 210 | 62 | Ex. |
| 19 | D | CR | 859 | 49 | 842 | 39 | 167 | 360 | 657 | Ex. |
| 20 | | GI | 864 | 79 | 839 | 27 | 196 | 230 | 96 | Ex. |
| 21 | | GA | 844 | 82 | 827 | 47 | 161 | 330 | 88 | Ex. |
| 22 | E | CR | 846 | 118 | 833 | 42 | 196 | 300 | 148 | Ex. |
| 23 | | GI | 842 | 44 | 830 | 44 | 210 | 340 | 69 | Ex. |
| 24 | | GA | 850 | 71 | 834 | 39 | 177 | 370 | 107 | Ex. |
| 25 | F | CR | 858 | 112 | 838 | 34 | 200 | 350 | 494 | Ex. |
| 26 | | GI | 859 | 50 | 839 | 40 | 182 | 240 | 96 | Ex. |
| 27 | | GA | 853 | 118 | 835 | 44 | 165 | 310 | 49 | Ex. |
| 28 | G | CR | 859 | 107 | 837 | 50 | 194 | 230 | 111 | Ex. |
| 29 | | GI | 856 | 51 | 836 | 40 | 170 | 290 | 36 | Ex. |
| 30 | | GA | 861 | 118 | 846 | 42 | 199 | 230 | 111 | Ex. |

| | | | Hot rolling process | | | | Cold | Annealing process | | | |
|---|---|---|---|---|---|---|---|---|---|---|---|
| | | | | | Finish | | | | | | |
| Steel sheet No. | Steel | Surface | Slab heat temp (° C.) | Left side of Expression (1) | rolling finishing temp (° C.) | Coiling temp (° C.) | rolling reduction rate (%) | Heat temp (° C.) | Re-heat retaining time (s) | Cooling start temp (° C.) | Cooling rate (° C./s) ※1 | Cooling stop temp (° C.) |
| 31 | H | CR | 1230 | 0.22 | 890 | 500 | 65 | 864 | 280 | 842 | 758 | 24 |
| 32 | | CR | 1180 | −0.74 | 860 | 590 | 45 | 850 | 147 | 841 | 659 | 22 |
| 33 | | GI | 1270 | 0.10 | 920 | 620 | 43 | 861 | 63 | 846 | 508 | 14 |
| 34 | | GA | 1270 | 0.15 | 890 | 640 | 66 | 840 | 183 | 832 | 345 | 27 |
| 35 | I | CR | 1260 | 0.28 | 890 | 570 | 56 | 847 | 291 | 837 | 532 | 33 |
| 36 | | GI | 1230 | 0.18 | 850 | 540 | 39 | 850 | 306 | 839 | 650 | 39 |
| 37 | | GA | 1270 | 0.16 | 840 | 570 | 62 | 861 | 110 | 844 | 637 | 34 |
| 38 | J | CR | 1260 | 0.41 | 930 | 550 | 61 | 850 | 280 | 840 | 376 | 17 |
| 39 | | GI | 1240 | 0.19 | 880 | 600 | 57 | 859 | 258 | 840 | 624 | 14 |
| 40 | | GA | 1270 | 0.21 | 870 | 530 | 67 | 860 | 317 | 845 | 329 | 34 |
| 41 | K | CR | 1240 | 0.09 | 900 | 610 | 46 | 852 | 64 | 839 | 271 | 17 |
| 42 | | GI | 1260 | 0.35 | 860 | 570 | 60 | 857 | 103 | 841 | 370 | 16 |
| 43 | | GA | 1250 | 0.09 | 920 | 540 | 32 | 863 | 294 | 842 | 382 | 24 |
| 44 | L | CR | 1240 | 0.40 | 900 | 490 | 40 | 848 | 129 | 840 | 643 | 21 |
| 45 | | GI | 1230 | 0.22 | 860 | 510 | 53 | 850 | 254 | 835 | 274 | 15 |
| 46 | | GA | 1270 | 0.14 | 860 | 480 | 40 | 862 | 329 | 841 | 629 | 33 |
| 47 | M | GA | 1240 | 0.27 | 880 | 500 | 58 | 846 | 236 | 834 | 753 | 16 |
| 48 | N | GA | 1240 | 0.29 | 880 | 440 | 34 | 842 | 194 | 835 | 462 | 17 |
| 49 | O | CR | 1260 | 0.32 | 880 | 590 | 49 | 855 | 260 | 840 | 316 | 37 |
| 50 | P | CR | 1250 | 0.24 | 930 | 500 | 35 | 858 | 219 | 840 | 673 | 40 |
| 51 | Q | CR | 1270 | 0.25 | 840 | 590 | 40 | 853 | 204 | 843 | 651 | 28 |

TABLE 2-continued

| Steel sheet No. | Steel | Surface | Re-heat temp (° C.) | Re-heat retaining time (s) | Cooling start temp (° C.) * | Cooling rate (° C./s) * ※2 | Cooling stop temp (° C.) * | Heating temp for tempering (° C.) | Retaining time for tempering (s) | Remarks |
|---|---|---|---|---|---|---|---|---|---|---|
| 31 | H | CR | 848 | 58 | 838 | 30 | 163 | 310 | 272 | Ex. |
| 32 |   | CR | 850 | 95 | 834 | 48 | 200 | 300 | 518 | Ex. |
| 33 |   | GI | 849 | 88 | 830 | 50 | 205 | 250 | 101 | Ex. |
| 34 |   | GA | 847 | 109 | 832 | 26 | 191 | 320 | 114 | Ex. |
| 35 | I | CR | 845 | 100 | 836 | 38 | 163 | 230 | 132 | Ex. |
| 36 |   | GI | 851 | 120 | 832 | 35 | 199 | 360 | 41 | Ex. |
| 37 |   | GA | 856 | 29 | 841 | 50 | 193 | 360 | 118 | Ex. |
| 38 | J | CR | 857 | 103 | 843 | 26 | 192 | 220 | 550 | Ex. |
| 39 |   | GI | 842 | 32 | 832 | 25 | 189 | 250 | 67 | Ex. |
| 40 |   | GA | 843 | 85 | 837 | 44 | 192 | 280 | 66 | Ex. |
| 41 | K | CR | 846 | 79 | 830 | 40 | 190 | 230 | 467 | Ex. |
| 42 |   | GI | 855 | 107 | 833 | 32 | 170 | 210 | 96 | Ex. |
| 43 |   | GA | 862 | 43 | 841 | 35 | 204 | 270 | 59 | Ex. |
| 44 | L | CR | 848 | 57 | 838 | 47 | 189 | 230 | 884 | Ex. |
| 45 |   | GI | 848 | 27 | 835 | 39 | 173 | 280 | 30 | Ex. |
| 46 |   | GA | 863 | 40 | 837 | 26 | 162 | 360 | 116 | Ex. |
| 47 | M | GA | 857 | 64 | 840 | 25 | 191 | 290 | 46 | Ex. |
| 48 | N | GA | 858 | 27 | 840 | 46 | 204 | 320 | 30 | Ex. |
| 49 | O | CR | 847 | 91 | 834 | 26 | 200 | 350 | 876 | Com. Ex. |
| 50 | P | CR | 857 | 50 | 835 | 49 | 198 | 220 | 261 | Com. Ex. |
| 51 | Q | CR | 851 | 47 | 839 | 45 | 183 | 220 | 428 | Com. Ex. |

Values outside the range of the present invention are underlined.
*Cooling condition after reheating
※1: Average cooling rate from a cooling starting temperature to a MS point in the case of without the coating layer Average cooling rate from a cooling starting temperature to 200° C. in the case of with the coating layer
※2: Average cooling rate from a cooling starting temperature to (MS point - 100° C.) in the case of not having the coating layer Average cooling rate from a cooling starting temperature to 200° C. in the case of having the coating layer Test samples were taken from cold-rolled steel sheet (CR material), hot-dip galvanized steel sheet (GI material) or hot-dip galvannealed steel sheet (GA material) obtained as described above and evaluated by the following method.

Structure Observation

Area fraction of each of the phases was evaluated by the following method. Test samples were taken from a steel sheet so that a cross-section parallel to the rolling direction may be used as an observation surface and a portion of the center of the sheet thickness was exposed by etching with 1% nital, and then a ¼t position (t is a total thickness) was photographed under a scanning type electron microscope at a magnification ratio of 2000 with 10 visual fields. The ferrite phase is a structure in which corrosion marks and iron-based carbides are not observed in the grains, and the tempered martensite is a structure in which a large number of minute iron-based carbides and corrosion marks having orientation are observed in the grains. The area fractions of the ferrite phase, the tempered martensite, and the other structures were determined and the results are shown in Table 3.

The grain size of the tempered martensite was obtained by image analysis using image analysis software (Image-Pro Plus ver. 7.0, manufactured by Nippon Rapor Co., Ltd.). Table 3 shows the average values of the grain sizes. For the image analysis, the photographs obtained with 10 visual fields during the measurement of the area fractions described above were used. The diameter of the circle having the same area as the area of a martensite grain was regarded as the martensite grain size, and the average value of the grain sizes was calculated.

The average particle size of the carbides (iron-based carbides or carbides including V, Ti and Nb) was determined by measuring the number and percentage of the carbides using a transmission electron microscope. The central portion in the plate thickness direction of the steel sheet was used as a target of observation, and with 300000-fold magnification, 300 carbides were randomly selected from the carbides on the tempered martensite grain boundary to determine the average particle size (or diameter). An energy dispersive X-ray analyzer attached to TEM was used for the identification of carbides. In addition, identification of the grain boundary was performed with 5000-fold by locating the grain boundaries of tempered martensites adjacent to each other, and a portion of the grain boundary identified was photographed by the method described above.

In order to investigate the element concentration (atomic concentration) of the tempered martensite grain boundary, a prism test sample of 0.5 mm×0.5 mm×25 mm was taken from the central portion of the sheet thickness in a direction parallel to the sheet thickness direction, at a position across the tempered martensite, and was electrolytically polished to prepare a test sample for measurement having an acicular tip. The element concentration present at the grain boundary was analyzed using a three-dimensional atom probe field ion microscope. The atomic concentrations of Si, Mn, Cr, Mo, Ni, B and Sb were obtained at the grain boundary having a width of ±0.25 nm away from the position where the element concentration was the maximum. Further, the grain boundary line was identified by way of analyzing C and regarding a portion with the highest C concentration as the grain boundary line.

Tensile Test

A JIS No. 5 tensile test sample was prepared from the steel sheet obtained in a direction perpendicular to the rolling direction and subjected to a tensile test five times according to the provision of JIS Z 2241 (2011) to obtain respective average values of yield strength (YS), a tensile strength (TS) and total elongation (El). The crosshead speed of the tensile test was 10 mm/min. In Table 3, the mechanical properties of the steel sheet required for the steel according to aspects of the present invention include the tensile strength: 900 MPa or higher.

Spot Welding Evaluation

For the evaluation of weldability, a plated steel sheet of JAC 270C having a sheet thickness of 1.0 mm according to the Japan Iron and Steel Federation Standard JFS A 3011:2014 was overlapped with the steel according to aspects of the invention or the comparative steel and subjected to spot welding. As welding conditions, a dome radius type chromium copper electrode with a tip diameter of 7 mmφ was used, with a welding time of 25 cycles (60 Hz), a pressing force of 300 kgf, and a nugget diameter of 6 mm. After welding with the different angles between the normal direction of the steel plate and the electrode being 10° and 15°, the cross-sectional structure of the welded portion in each case was observed and the presence or absence of cracks was observed. In the case where cracks of 10 μm or more occurred, "x" was given as failure, and otherwise, "○" is given as "pass", and the results are shown in Table 3.

In all the examples of the present invention, it is understood that the tensile strength TS was 900 MPa or higher, and excellent weldability was obtained. Meanwhile, in the Comparative Examples outside the scope of the present invention, the tensile strength of 900 MPa was not achieved or excellent weldability evaluation was not obtained.

TABLE 3

| | Steel sheet structure | | | | | | | Mechanical properties of steel sheet | | | Weldability | | |
|---|---|---|---|---|---|---|---|---|---|---|---|---|---|
| Steel No. | Ferrite area fraction (%) | Tempered martensite area percentage (%) | Other structure area fraction (%) *1 | Tempered martensite grain size (μm) | Atomic concentration of Si + Mn (atom %) | Iron-based carbide grain size (nm) | Total concentration of M atom (atom %) *2 | Carbide particle size including N atoms (nm) *3 | Yield strength (MPa) | Tensile strength (MPa) | Elongation (%) | Evaluation 1 *4 | Evaluation 2 *5 | Remarks |
| 1 | 17 | 83 | 0 | 3.2 | 6 | 30 | — | — | 713 | 903 | 15 | ○ | x | Ex. |
| 2 | 24 | 71 | 5 | 2.8 | 11 | 61 | — | — | 686 | 915 | 16 | ○ | ○ | Ex. |
| 3 | 4 | 96 | 0 | 3.0 | 7 | 37 | — | — | 636 | 908 | 16 | ○ | ○ | Ex. |
| 4 | 13 | 86 | 1 | 2.0 | 3 | 51 | — | — | 642 | 904 | 16 | x | x | Com. Ex. |
| 5 | 0 | 97 | 3 | 3.4 | 4 | 40 | — | — | 691 | 909 | 15 | x | x | Com. Ex. |
| 6 | 25 | 73 | 2 | 3.4 | 4 | 48 | — | — | 743 | 917 | 16 | x | x | Com. Ex. |
| 7 | 45 | 54 | 1 | 2.0 | 3 | 42 | — | — | 658 | 866 | 17 | x | x | Com. Ex. |
| 8 | 28 | 69 | 3 | 2.7 | 4 | 39 | — | — | 775 | 901 | 16 | x | x | Com. Ex. |
| 9 | 2 | 98 | 0 | 5.8 | 8 | 39 | — | — | 717 | 919 | 15 | x | x | Com. Ex. |
| 10 | 1 | 95 | 4 | 1.8 | 7 | 125 | — | — | 651 | 857 | 17 | x | x | Com. Ex. |
| 11 | 0 | 100 | 0 | 2.3 | 8 | 117 | — | — | 621 | 887 | 16 | x | x | Com. Ex. |
| 12 | 10 | 88 | 2 | 1.8 | 12 | 108 | — | — | 750 | 893 | 16 | x | x | Com. Ex. |
| 13 | 9 | 90 | 1 | 2.7 | 7 | 55 | — | — | 785 | 1006 | 15 | ○ | x | Ex. |
| 14 | 20 | 79 | 1 | 1.8 | 7 | 61 | — | — | 805 | 1006 | 15 | ○ | ○ | Ex. |
| 15 | 11 | 89 | 0 | 2.5 | 8 | 48 | — | — | 798 | 1010 | 15 | ○ | ○ | Ex. |
| 16 | 7 | 91 | 2 | 2.1 | 7 | 47 | — | — | 878 | 1155 | 13 | ○ | x | Ex. |
| 17 | 4 | 91 | 5 | 2.6 | 8 | 25 | — | — | 870 | 1160 | 12 | ○ | x | Ex. |
| 18 | 11 | 89 | 0 | 2.5 | 8 | 62 | — | — | 961 | 1158 | 12 | ○ | x | Ex. |
| 19 | 4 | 93 | 3 | 2.8 | 7 | 31 | — | 9 | 912 | 1140 | 12 | ○ | x | Ex. |
| 20 | 3 | 92 | 5 | 3.7 | 7 | 23 | — | 13 | 936 | 1141 | 13 | ○ | x | Ex. |
| 21 | 15 | 84 | 1 | 2.6 | 12 | 65 | — | 8 | 908 | 1149 | 12 | ○ | ○ | Ex. |
| 22 | 1 | 94 | 5 | 3.7 | 10 | 53 | — | 10 | 813 | 1029 | 14 | ○ | ○ | Ex. |
| 23 | 15 | 80 | 5 | 3.4 | 11 | 33 | — | 4 | 857 | 1033 | 14 | ○ | ○ | Ex. |
| 24 | 22 | 77 | 1 | 2.3 | 9 | 20 | — | 3 | 818 | 1022 | 15 | ○ | ○ | Ex. |
| 25 | 25 | 70 | 5 | 1.9 | 7 | 50 | — | 3 | 784 | 1018 | 15 | ○ | ○ | Ex. |
| 26 | 14 | 84 | 2 | 3.8 | 10 | 33 | — | 9 | 722 | 1031 | 14 | ○ | ○ | Ex. |
| 27 | 12 | 86 | 2 | 2.7 | 9 | 64 | — | 3 | 855 | 1030 | 14 | ○ | ○ | Ex. |
| 28 | 20 | 75 | 5 | 3.8 | 7 | 34 | — | 6 | 797 | 1009 | 15 | ○ | ○ | Ex. |
| 29 | 3 | 96 | 1 | 2.5 | 8 | 53 | — | 7 | 716 | 1008 | 15 | ○ | ○ | Ex. |
| 30 | 5 | 90 | 5 | 2.7 | 12 | 36 | — | 7 | 716 | 1009 | 15 | ○ | ○ | Ex. |
| 31 | 0 | 95 | 5 | 2.5 | 12 | 62 | 12 | — | 756 | 1080 | 13 | ○ | ○ | Ex. |
| 32 | 0 | 100 | 0 | 2.4 | 8 | 61 | 17 | — | 867 | 1070 | 13 | ○ | x | Ex. |
| 33 | 18 | 79 | 3 | 2.4 | 10 | 41 | 17 | — | 872 | 1077 | 13 | ○ | ○ | Ex. |
| 34 | 25 | 70 | 5 | 2.2 | 7 | 26 | 9 | — | 819 | 1064 | 14 | ○ | ○ | Ex. |
| 35 | 3 | 94 | 3 | 3.2 | 7 | 64 | 9 | — | 833 | 1028 | 15 | ○ | ○. | Ex. |
| 36 | 21 | 74 | 5 | 1.9 | 10 | 59 | 13 | — | 831 | 1026 | 15 | ○ | ○ | Ex. |
| 37 | 2 | 95 | 3 | 2.1 | 10 | 47 | 16 | — | 854 | 1029 | 14 | ○ | ○ | Ex. |
| 38 | 7 | 91 | 2 | 2.0 | 9 | 58 | 7 | — | 817 | 1061 | 14 | ○ | ○ | Ex. |
| 39 | 6 | 90 | 4 | 2.2 | 12 | 58 | 14 | — | 861 | 1063 | 14 | ○ | ○ | Ex. |
| 40 | 21 | 74 | 5 | 2.6 | 11 | 33 | 14 | — | 838 | 1061 | 14 | ○ | ○ | Ex. |
| 41 | 14 | 85 | 1 | 2.3 | 11 | 23 | 14 | — | 969 | 1226 | 11 | ○ | ○ | Ex. |
| 42 | 15 | 85 | 0 | 2.5 | 12 | 49 | 15 | — | 958 | 1228 | 13 | ○ | ○ | Ex. |
| 43 | 12 | 86 | 2 | 2.0 | 8 | 52 | 15 | — | 965 | 1222 | 12 | ○ | ○ | Ex. |
| 44 | 5 | 95 | 0 | 2.0 | 8 | 37 | 9 | 4 | 963 | 1250 | 13 | ○ | ○ | Ex. |
| 45 | 10 | 87 | 3 | 2.3 | 8 | 26 | 12 | 10 | 935 | 1246 | 11 | ○ | ○ | Ex. |

TABLE 3-continued

| | | | | Steel sheet structure | | | | | | | | | | |
|---|---|---|---|---|---|---|---|---|---|---|---|---|---|---|
| | | Tempered martensite | Other structure area | Tempered martensite | Atomic concentration | Iron-based | Total concentration | Carbide particle size including | Mechanical properties of steel sheet | | | Weldability | | |
| | Ferrite | | | | | | | | | | | | | |
| Steel No. | area fraction (%) | area percentage (%) | fraction (%) *1 | grain size (μm) | of Si + Mn (atom %) | carbide grain size (nm) | of M atom (atom %) *2 | N atoms (nm) *3 | Yield strength (MPa) | Tensile strength (MPa) | Elongation (%) | Evaluation 1 *4 | Evaluation 2 *5 | Remarks |
| 46 | 5 | 95 | 0 | 2.2 | 11 | 23 | 13 | 4 | 977 | 1237 | 12 | ○ | ○ | Ex. |
| 47 | 0 | 99 | 1 | 2.6 | 8 | 39 | 10 | 10 | 854 | 1029 | 14 | ○ | ○ | Ex. |
| 48 | 17 | 80 | 3 | 2.6 | 7 | 46 | 17 | 12 | 899 | 1183 | 12 | ○ | ○ | Ex. |
| 49 | 8 | 88 | 4 | 2.0 | 11 | 38 | — | — | 637 | 806 | 18 | ○ | ○ | Com. Ex. |
| 50 | 4 | 96 | 0 | 2.8 | 3 | 21 | 13 | — | 799 | 987 | 15 | x | x | Com. Ex. |
| 51 | 15 | 84 | 1 | 2.3 | 3 | 61 | 15 | — | 703 | 925 | 15 | x | x | Com. Ex. |

※1) Total area fraction of microstructure other than ferrite and tempered martensite
※2) Total M atomic concentration (Cr, Mo, Ni, B, and Sb)
※3) Average size of carbide particles of N atoms (V, Ti, and Nb)
※4) Result of determining cross-sectional structure when the normal direction of the steel sheet and the electrode is at 10°
※5) Result of determining cross-sectional structure when the normal direction of the steel sheet and the electrode is at 15°
The underlines indicate the ranges are outside the present invention.

All the Examples of the present invention satisfy the weldability evaluation 1. Meanwhile, under the welding condition 2 as a more severe condition, the example at the level satisfying the preferable range of the slab heating condition in addition to the controlled grain boundary atom concentrations of Cr, Mo, Ni, B and Sb obtained excellent evaluations.

The invention claimed is:

1. A steel sheet comprising:
a composition containing, in mass %,
C: 0.07% or more and 0.20% or less,
Si: 0.60% or more and 1.65% or less,
Mn: 1.8% or more and 3.5% or less,
P: 0.05% or less,
S: 0.005% or less,
Al: 0.08% or less,
N: 0.0060% or less, and
the balance being Fe and unavoidable impurities;
a microstructure containing, by area fraction, ferrite of 30% or less (including 0%), tempered martensite of 70% or more (including 100%), and the balance other than the ferrite and the tempered martensite including 10% or less (including 0%) in total,
the tempered martensite having an average grain size of is of 5 μm or less,
the tempered martensite having iron-based carbides, which have an average particle size of 100 nm or less, precipitated on grain boundaries thereof, and
the tempered martensite containing, in terms of atomic concentration, 5% or more in total of Si and Mn on the grain boundaries of the tempered martensite; and
a tensile strength of 900 MPa or higher.

2. The steel sheet according to claim 1, wherein the composition further contains, in mass %, one or two or more selected from at least one of groups A to C:
group A
V: 0.001% or more and 1% or less,
Ti: 0.001% or more and 0.3% or less, and
Nb: 0.001% or more and 0.3% or less, and
the microstructure contains a carbide containing at least one of V, Ti, and Nb and having an average particle size of 20 nm or less,
group B
Cr: 0.001% or more and 1.0% or less,
Mo: 0.001% or more and 1.0% or less,
Ni: 0.001% or more and 1.0% or less,
B: 0.0001% or more and 0.0050% or less, and
Sb: 0.001% or more and 0.050% or less, and
the microstructure contains, in terms of atomic concentration, 5% or more in total of Cr, Mo, Ni, B, and Sb on the grain boundaries of the tempered martensite,
Group C
REM, Sn, Mg, and Ca of 0.0001% or more and 0.1% or less in total.

3. The steel sheet according to claim 1, further comprising a coating layer on the surface thereof.

4. The steel sheet according to claim 2, further comprising a coating layer on the surface thereof.

5. The steel sheet according to claim 3, wherein the coating layer has a composition containing, in mass %, Fe: 20.0% or less, Al: 0.001% or more and 3.5% or less, one or two or more selected from Pb, Sb, Si, Sn, Mg, Mn, Ni, Cr, Co, Ca, Cu, Li, Ti, Be, Bi, and REM of 0% to 3.5% in total, and the balance being Zn and unavoidable impurities.

6. The steel sheet according to claim 4, wherein the coating layer has a composition containing, in mass %, Fe: 20.0% or less, Al: 0.001% or more and 3.5% or less, one or two or more selected from Pb, Sb, Si, Sn, Mg, Mn, Ni, Cr, Co, Ca, Cu, Li, Ti, Be, Bi, and REM of 0% to 3.5% in total, and the balance being Zn and unavoidable impurities.

7. The steel sheet according to claim 3, wherein the coating layer is an alloyed hot-dip layer.

8. The steel sheet according to claim 4, wherein the coating layer is an alloyed hot-dip layer.

9. The steel sheet according to claim 5, wherein the coating layer is an alloyed hot-dip layer.

10. The steel sheet according to claim 6, wherein the coating layer is an alloyed hot-dip layer.

11. A method for producing the steel sheet according to claim 1, the method comprising:
heating a steel material at 1150° C. or higher and 1350° C. or lower,
hot-rolling including rough rolling and finish rolling the steel material at a finish rolling temperature of 820° C. or higher,
coiling at 350° C. or higher and 680° C. or lower, cold-rolling,
heating and retaining at 840° C. or higher and 880° C. or lower for 30 seconds or more,
then cooling to 100° C. or lower at an average cooling rate of 200° C./s or more from a cooling starting temperature to a Ms point,
re-heating and retaining at 840° C. or higher for 30 seconds or more,
then cooling to (Ms point—100° C.) or lower and 160° C. or higher at an average cooling rate of 20° C./s or more from a cooling starting temperature to (Ms point—100° C.),
heating or cooling as necessary, and
retaining at 200° C. or higher and 400° C. or lower for 20 seconds or more and 1800 seconds or less.

12. A method for producing the steel sheet according to claim 2, the method comprising:
heating a steel material at 1150° C. or higher and 1350° C. or lower,
hot-rolling including rough rolling and finish rolling the steel material at a finish rolling temperature of 820° C. or higher,
coiling at 350° C. or higher and 680° C. or lower,
cold-rolling,
heating and retaining at 840° C. or higher and 880° C. or lower for 30 seconds or more,
then cooling to 100° C. or lower at an average cooling rate of 200° C./s or more from a cooling starting temperature to a Ms point,
re-heating and retaining at 840° C. or higher for 30 seconds or more,
then cooling to (Ms point—100° C.) or lower and 160° C. or higher at an average cooling rate of 20° C./s or more from a cooling starting temperature to (Ms point—100° C.),
heating or cooling as necessary, and
retaining at 200° C. or higher and 400° C. or lower for 20 seconds or more and 1800 seconds or less.

13. A method for producing the steel sheet according to claim 3, the method comprising:
heating a steel material at 1150° C. or higher and 1350° C. or lower,
hot-rolling including rough rolling and finish rolling at a finish rolling temperature of 820° C. or higher,
coiling at 350° C. or higher and 680° C. or lower,
cold-rolling,
heating and retaining at 840° C. or higher and 880° C. or lower for 30 seconds or more,
then cooling to 100° C. or lower at an average cooling rate of 200° C./s or more from a cooling starting temperature to 200° C.,
re-heating and retaining at 840° C. or higher for 10 seconds or more and 150 seconds or less,
then cooling to 260° C. or lower and 160° C. or higher at an average cooling rate of 20° C./s or more from a cooling starting temperature to 260° C.,
heating or cooling as necessary,
retaining at 200° C. or higher and 400° C. or lower for 20 seconds or more and 150 seconds or less, and
subjecting to a coating treatment by immersing in a plating bath, or subjecting to an alloying treatment in addition to the coating treatment.

14. A method for producing the steel sheet according to claim 4, the method comprising:
heating a steel material at 1150° C. or higher and 1350° C. or lower,
hot-rolling including rough rolling and finish rolling at a finish rolling temperature of 820° C. or higher,
coiling at 350° C. or higher and 680° C. or lower,
cold-rolling,
heating and retaining at 840° C. or higher and 880° C. or lower for 30 seconds or more,
then cooling to 100° C. or lower at an average cooling rate of 200° C./s or more from a cooling starting temperature to 200° C.,
re-heating and retaining at 840° C. or higher for 10 seconds or more and 150 seconds or less,
then cooling to 260° C. or lower and 160° C. or higher at an average cooling rate of 20° C./s or more from a cooling starting temperature to 260° C.,
heating or cooling as necessary,
retaining at 200° C. or higher and 400° C. or lower for 20 seconds or more and 150 seconds or less, and
subjecting to a coating treatment by immersing in a plating bath, or subjecting to an alloying treatment in addition to the coating treatment.

15. A method for producing the steel sheet according to claim 5, the method comprising:
heating a steel material at 1150° C. or higher and 1350° C. or lower,
hot-rolling including rough rolling and finish rolling at a finish rolling temperature of 820° C. or higher,
coiling at 350° C. or higher and 680° C. or lower,
cold-rolling,
heating and retaining at 840° C. or higher and 880° C. or lower for 30 seconds or more,
then cooling to 100° C. or lower at an average cooling rate of 200° C./s or more from a cooling starting temperature to 200° C.,
re-heating and retaining at 840° C. or higher for 10 seconds or more and 150 seconds or less,
then cooling to 260° C. or lower and 160° C. or higher at an average cooling rate of 20° C./s or more from a cooling starting temperature to 260° C.,
heating or cooling as necessary,
retaining at 200° C. or higher and 400° C. or lower for 20 seconds or more and 150 seconds or less, and
subjecting to a coating treatment by immersing in a plating bath, or subjecting to an alloying treatment in addition to the coating treatment.

16. A method for producing the steel sheet according to claim 6, the method comprising:
heating a steel material at 1150° C. or higher and 1350° C. or lower,
hot-rolling including rough rolling and finish rolling at a finish rolling temperature of 820° C. or higher,
coiling at 350° C. or higher and 680° C. or lower,
cold-rolling,
heating and retaining at 840° C. or higher and 880° C. or lower for 30 seconds or more,
then cooling to 100° C. or lower at an average cooling rate of 200° C./s or more from a cooling starting temperature to 200° C.,
re-heating and retaining at 840° C. or higher for 10 seconds or more and 150 seconds or less,
then cooling to 260° C. or lower and 160° C. or higher at an average cooling rate of 20° C./s or more from a cooling starting temperature to 260° C.,
heating or cooling as necessary,
retaining at 200° C. or higher and 400° C. or lower for 20 seconds or more and 150 seconds or less, and subjecting to a coating treatment by immersing in a plating bath, or subjecting to an alloying treatment in addition to the coating treatment.

17. A method for producing the steel sheet according to claim 7, the method comprising:
heating a steel material at 1150° C. or higher and 1350° C. or lower,
hot-rolling including rough rolling and finish rolling at a finish rolling temperature of 820° C. or higher,
coiling at 350° C. or higher and 680° C. or lower,
cold-rolling,
heating and retaining at 840° C. or higher and 880° C. or lower for 30 seconds or more,
then cooling to 100° C. or lower at an average cooling rate of 200° C./s or more from a cooling starting temperature to 200° C.,
re-heating and retaining at 840° C. or higher for 10 seconds or more and 150 seconds or less,
then cooling to 260° C. or lower and 160° C. or higher at an average cooling rate of 20° C./s or more from a cooling starting temperature to 260° C.,
heating or cooling as necessary,
retaining at 200° C. or higher and 400° C. or lower for 20 seconds or more and 150 seconds or less, and
subjecting to a coating treatment by immersing in a plating bath, or subjecting to an alloying treatment in addition to the coating treatment.

18. A method for producing the steel sheet according to claim 8, the method comprising:
heating a steel material at 1150° C. or higher and 1350° C. or lower,
hot-rolling including rough rolling and finish rolling at a finish rolling temperature of 820° C. or higher,
coiling at 350° C. or higher and 680° C. or lower,
cold-rolling,
heating and retaining at 840° C. or higher and 880° C. or lower for 30 seconds or more,
then cooling to 100° C. or lower at an average cooling rate of 200° C./s or more from a cooling starting temperature to 200° C.,
re-heating and retaining at 840° C. or higher for 10 seconds or more and 150 seconds or less,
then cooling to 260° C. or lower and 160° C. or higher at an average cooling rate of 20° C./s or more from a cooling starting temperature to 260° C.,
heating or cooling as necessary,
retaining at 200° C. or higher and 400° C. or lower for 20 seconds or more and 150 seconds or less, and
subjecting to a coating treatment by immersing in a plating bath, or subjecting to an alloying treatment in addition to the coating treatment.

19. A method for producing the steel sheet according to claim 9, the method comprising:
heating a steel material at 1150° C. or higher and 1350° C. or lower,
hot-rolling including rough rolling and finish rolling at a finish rolling temperature of 820° C. or higher,
coiling at 350° C. or higher and 680° C. or lower,
cold-rolling,
heating and retaining at 840° C. or higher and 880° C. or lower for 30 seconds or more,
then cooling to 100° C. or lower at an average cooling rate of 200° C./s or more from a cooling starting temperature to 200° C.,
re-heating and retaining at 840° C. or higher for 10 seconds or more and 150 seconds or less,
then cooling to 260° C. or lower and 160° C. or higher at an average cooling rate of 20° C./s or more from a cooling starting temperature to 260° C.,
heating or cooling as necessary,
retaining at 200° C. or higher and 400° C. or lower for 20 seconds or more and 150 seconds or less, and
subjecting to a coating treatment by immersing in a plating bath, or subjecting to an alloying treatment in addition to the coating treatment.

20. A method for producing the steel sheet according to claim 10, the method comprising:
heating a steel material at 1150° C. or higher and 1350° C. or lower,
hot-rolling including rough rolling and finish rolling at a finish rolling temperature of 820° C. or higher,
coiling at 350° C. or higher and 680° C. or lower,
cold-rolling,
heating and retaining at 840° C. or higher and 880° C. or lower for 30 seconds or more,
then cooling to 100° C. or lower at an average cooling rate of 200° C./s or more from a cooling starting temperature to 200° C.,
re-heating and retaining at 840° C. or higher for 10 seconds or more and 150 seconds or less,
then cooling to 260° C. or lower and 160° C. or higher at an average cooling rate of 20° C./s or more from a cooling starting temperature to 260° C.,
heating or cooling as necessary,
retaining at 200° C. or higher and 400° C. or lower for 20 seconds or more and 150 seconds or less, and
subjecting to a coating treatment by immersing in a plating bath, or subjecting to an alloying treatment in addition to the coating treatment.

* * * * *